United States Patent [19]
Haasl

[11] Patent Number: 4,536,454
[45] Date of Patent: Aug. 20, 1985

[54] FLEXIBLE COATING COMPOSITION AND METHOD OF APPLYING SAME

[75] Inventor: Robert J. Haasl, St. Paul, Minn.

[73] Assignee: PDI, Inc., St. Paul, Minn.

[21] Appl. No.: 526,646

[22] Filed: Aug. 26, 1983

[51] Int. Cl.[3] .......................... B32B 27/08; B05D 3/02

[52] U.S. Cl. .................................. 428/516; 427/407.1; 427/409; 427/410; 427/412.3; 428/413; 428/424.4; 428/462; 428/463; 428/520

[58] Field of Search ..................... 427/409, 410, 407.1, 427/421, 412.3; 428/457, 461, 462, 463, 516, 520

[56] References Cited

U.S. PATENT DOCUMENTS 4,324,708 4/1982 Ito et al. ......................... 427/409 X
4,355,071 10/1982 Chang ............................. 427/409 X

*Primary Examiner*—Thurman K. Page
*Attorney, Agent, or Firm*—Orrin M. Haugen; Thomas J. Nikolai; Douglas L. Tschida

[57] ABSTRACT

A method of protecting surfaces of structural items from exposure to the elements, which includes forming first and second protective films upon the surface to be protected. The primary coating is an adherent-coherent film having a formulation including:

1. Methylmethacrylate copolymer film formers
2. A solvent system of toluene and 2-methoxyethanol
3. Fillers, such as $SiO_2$
4. Miscellaneous solvents.

which is applied as a working film-forming solution and permitted to air dry. Thereafter, a secondary or top coating of an adherent-coherent film is applied over the surface of the primary coating, with the top coat or secondary coating having a formulation including:

1. Thermoplastic Rubber
2. Fillers, such as $SiO_2$ and $CaCO_3$
3. Tackifier
4. Heat and Light Stabilizers
5. Miscellaneous Solvents and applied in a working solution and permitted to air dry. The resulting layers provide a synergistic effect when sequentially applied, and result in an air-tight film preventing the occurrence of either corrosion or rust, particularly when applied over metal surfaces.

6 Claims, No Drawings

FLEXIBLE COATING COMPOSITION AND METHOD OF APPLYING SAME

BACKGROUND OF THE INVENTION

The present invention relates to an improved coating system and to the method for applying it to surfaces where long term protection from exposure to adverse environmental conditions is required. The metal surfaces of food processing plants, for example, demand coatings which do not crack and flake. Another application for a flexible coating is the protection of automobile body surfaces, where the sheet metal parts are subject to attack by the salt applied to road surfaces for ice removal. Presently available rust protection and rust-prevention techniques, while helpful, leave room for considerable improvement. Automobiles are a particularly common problem, and considering the high cost of these products, a long-term reliable rust prevention treatment would be highly desirable and useful.

The method of the present invention includes the utilization of first and second films which are applied sequentially over the surface to be protected, and the resultant composite film is one which has been found to be highly desirable from the standpoint of preventing and/or resisting corrosion and/or rust formation. The combined films are both adherent and coherent, and form a tough composite film which remains flexible under normal ambient conditions. The composite film provides good bond strength, as well as good peel strength characteristics. Generally, the present invention utilizes a coating system comprising a pigmented primer and a flexible pigmented top coat, which provides a composite system which protects the surface of ferrous metals from attack by salt, humidity and the ambient. The preferred application technique for both films is by pressurized spraying, although other application techniques may be employed if desired.

In the protection of surfaces from environmental and/or ambient conditions, the utilization of tough flexible films is desirable. It occurs, however, that if a film is to be rendered extremely tough and durable, it may lack certain flexural characteristics. As a result, such films may have a tendency toward chipping and/or cracking whenever the substrate is subjected to unusual flexure. If the toughness is to be sacrificed, then the films tend to be less impervious and more susceptible to mechanical damage, and hence may be more likely to chip and/or fracture when exposed to unusual mechanical forces.

Surface protecting films are normally formulated and/or provided with a variety of physical and/or chemical properties as goals or objectives. Specifically, such properties as adhesion, cohesion, bond strength, peel strength and toughness are all highly desirable. Generally, these properties are desirable, and are normally increased whenever possible. As it turns out, however, certain of these properties may be increased only at the expense of others, and hence lie at cross-purposes, one to another. Therefore, one must utilize a compromise or balance of properties in order to achieve objectives or goals in the preparation of film forming materials.

SUMMARY OF THE INVENTION

In accordance with the present invention, however, a system has been provided wherein highly adherent and coherent layers are provided with these layers having excellent bond strength, excellent peel strength, and toughness and flexibility which permits the film combination to be utilized under extremely adverse weather and/or environmentally-ambient conditions. Also, the films may be provided with rust-inhibiting characteristics, thereby preserving the quality and nature of metallic substrate surfaces such as automobiles. The films have been found to weather well, and stand up against those various ambient conditions which are frequently encountered in adverse environments including industrial installations, such as slaughterhouse or food processing plants or the like. The film is tough, flexible, impervious to acids, alkalies, salt, moisture, and capable of withstanding exposure to any weather conditions and remains flexible over a wide range of temperatures.

In accordance with the process of the present invention, an initial or primary coat of a film-forming material is applied to the surface to be protected. This primary coating utilizes as its more active ingredients or film-forming ingredients the following:

1. Methylmethacrylate copolymer film formers
2. A solvent system of toluene and 2-methoxyethanol
3. Fillers, such as $SiO_2$
4. Miscellaneous solvents.

This initial coating is permitted to dry, with a solvent of 1,1,1 Trichloroethane preferably being employed as a fugitive solvent, whereupon a secondary coating is applied thereover. The top coat or secondary coating is an adherent-coherent film with the following basic formulation:

1. Thermoplastic Rubber
2. Fillers, such as $SiO_2$ and $CaCO_3$
3. Tackifier
4. Heat and Light Stabilizers
5. Miscellaneous Solvents After application of the top coating or secondary coating, the combined film forming materials are permitted to air-dry to form an air-tight and water-impermeable seal.

Because of its unusual physical properties and desirable qualities, the materials useful in the present process may be employed for rustproofing automobiles, painting exterior bridge structures, as well as other types of exposed surfaces. Furthermore, the material is acceptable for use in coating walls of food-processing facilities and plants, being free of harmful or hazardous components.

Composite films prepared in accordance with the present invention cure to a pin-hole free state, and yet remain both tough and flexible. Since the films possess the property of being non-absorbant to water, they provide protection to the substrate against damage due to water absorption. Suitable corrosion inhibiting components may be provided, if desired, with examples of such corrosion inhibitors being either strontium or zinc chromate.

Therefore, it is a primary object of the present invention to provide an improved technique for applying protective films or coatings over exposed surfaces such as automobiles and the like, with the technique providing a finished composite film which is highly adhesive and cohesive, and possesses good bond strength and high peel strength.

It is a further object of the present invention to provide an improved technique for coating exposed metallic surfaces for protection from adverse weather and ambient conditions, wherein the composite film is one having highly desirable adhesive and cohesive properties, high bond and peel strengths, as well as being tough, durable and flexible.

It is yet a further object of the present invention to provide an improved composite film for protection of exposed ferrous and other metallic surfaces from exposure to adverse weather and/or ambient conditions, and wherein the composite film forms an air-tight seal over the surface being protected, and furthermore is provided with a rust inhibitor.

Other and further objects of the present invention will become apparent to those skilled in the art upon a study of the following specification and appended claims.

DESCRIPTION OF THE PREFERRED EMBODIMENT

EXAMPLE I

PRIMER COAT FORMULATION

| Component | Weight Percent |
|---|---|
| Thermoplastic resin consisting of methylmethacrylate copolymer, 45% solution in 54/1 ratio of toluene and 2-methoxyethanol | 30.00 |
| Silicon dioxide filler (Cabosil N70-TS) | 2.25 |
| A thermoplastic rubber consisting of styrene/ethylene/butylene/ styrene block copolymer | 0.30 |
| 1,1,1,-trichloroethane | 67.45 |

To 100 parts of the above formulation were added with stirring, the following pigment dispersions supplied by the Tenneco Chemical Company:

1. 3.07 parts by weight of White General Dispersion, Code 824-0082. (Pigment 72.5%, Vehicle 19.6%, and Volatiles 7.9%).
2. 0.15 parts by weight Black General Dispersion, Code 824-9946. (Pigments 26.4%, Vehicle 41.4%, and Volatiles 32.5%).

Mixing was continued for one hour until a homogeneous pigment dispersion was achieved.

Methylmethacrylate copolymers are commercially available. One which has been found particularly useful is sold by Rohm & Haas Company of Philadelphia, Pa. under the code designation "Acryloid B-48N". Other methylmethacrylate copolymers may be utilized as well.

The thermoplastic rubber component consists of a styrene/ethylene/butylene/styrene block copolymer. The hydrogenated version of these block copolymers is utilized. Such materials are, of course, commercially available.

This material is applied to the surface to be protected as a film, and may be applied by either dipping, brushing, spraying, rolling, or aerosol procedures. Spray application is preferred. After application, the film is permitted to dry, with the solvent becoming, as is normal, fugitive to the system.

Thereafter, a secondary coating of an adherent-coherent material is applied over the surface of the primary coating, with the secondary coating having a formulation in a working solution as follows:

TOP COAT FORMULATION

| Component | Weight Percent |
|---|---|
| A thermoplastic rubber consisting essentially of a styrene/ethylene/butylene/styrene block copolymer sold by Shell Chemical Co. of San Francisco, CA under the designation "Kraton G-1652" | 13.86 |
| Silicon dioxide filler (Cabosil M-5) | 1.49 |
| A tackifier such as Piccotac B-BHT sold by Pennsylvania Industrial Chemical Corp. of Clairton, PA | 5.33 |
| Calcium Carbonate | 3.84 |
| An antioxidant such as that certain antioxidant sold by Geigy Chemical Corp. of Yonkers, NY under the trade designation "Irganox 1010" | 0.025 |
| An ultraviolet stabilizer such as that certain stabilizer sold by Geigy Chemical Corp. of Yonkers, NY under the trade designation "Tinuvin P" | 0.025 |
| A solvent including a mixture of 50/19/7 of 1,1,1-trichloroethane, VMP Naptha and methylene chloride | 74.69 |
| Dinitro, a certain pigment-vehicle-volatile mixture sold under the trade designation "Tenneco Orange" from Tennessee Corporation of Atlanta, GA, with the material sold under the code designation 824-0924 containing 44% pigment, 45% vehicle and 11% volatiles | 0.75 |

This secondary or top-coat material may be applied as either an aerosol, or by brushing and/or dipping, as the circumstances dictate, with spray application being preferred. Following application, the secondary coating is permitted to air dry.

The light gray pigmented primer coating is sprayed onto the metal surface which is first cleaned thoroughly by means of sand blasting or other conventional metal cleaning techniques, followed by solvent cleaning with a degreasing solvent, such as 1,1,1-trichloroethane. The pigmented primer formulation was diluted with a 1:1 ratio of a 50/19/7 mixture of 1,1,1-trichloroethane, VMP Naptha, and methylene chloride. Polar solvents are preferred. After mixing, the thinned primer formulation is transferred to a pressurized feed pot for spraying by means of a Binks Model 62 spray gun. Pot pressure is regulated to 10 lbs./sq. inch and atomizing pressure, using a #63 fluid cap, is set at 30 lbs./sq. inch. The primer coated metal surface is allowed to dry for 15 minutes to yield a coating having a thickness of approximately 1 to 2 mils.

The top coat formulation is sprayed over the primer coating using the same equipment which is used to spray the primer coat. The pot pressure and atomizing pressure are adjusted to a higher pressure of an additional 10 lbs./sq. inch. The top coat formulation is first diluted with a 4:3 ratio of the same solvent mixture used to thin the primer coat formulation. To four parts of top coat formulation is added three parts of solvent mixture. The top coat formulation is sprayed over the primer coat in two full coats, allowing 15 minutes drying time between coats. The top coating dries to a thickness of about 8 to 12 mils for a two-coat treatment.

EXAMPLE II

The primer coating of the formulation of Example I was applied as set forth in Example I.

The top coat was prepared of the following formulation:

TOP COAT FORMULATION, II

| Component | Weight Percent Clear | Weight Percent Red |
|---|---|---|
| Styrene/ethylene/butylene/styrene block copolymer sold by Shell Chemical Co. of San Francisco, CA under the trade designation "Kraton G-1562" | 14.01 | 13.91 |
| Silicon dioxide filler (Cabosil M-5) (Aerosol 200) | 1.40 | 1.07 |
| Silicon dioxide filler (Cabosil N-70-TS) (Aerosol R972) | — | 1.07 |
| A tackifier such as Piccotac B-BHT sold by Pennsylvania Industrial Chemical Corp. of Clairton, PA | 5.39 | 5.35 |
| Calcium carbonate | 3.88 | 3.85 |
| An antioxidant such as that certain antioxidant sold by Geigy Chemical Corp. of Yonkers, NY under the trade designation "Irganox 1010" | 0.025 | 0.025 |
| An ultraviolet stabilizer such as that certain stabilizer sold by Geigy Chemical Corp. of Yonkers, NY under the trade designation "Tinuvin P" | 0.025 | 0.025 |
| A solvent including a mixture of 50/19/7 of 1,1,1-trichloroethane, VMP Naptha and methylene chloride | 75.25 | 74.69 |
| Red Pigment (GPD-0721) | None | 0.93 |

GENERAL CONSIDERATIONS

While the formulation as set forth above is specific to virtually universal application, with the range of components being set forth as follows for the primary coating:

| Component | Weight Percent |
|---|---|
| Thermoplastic resin consisting of methylmethacrylate copolymer, 45% solution in 54:1 ratio of toluene and 2 methoxyethanol | 20–50 |
| A thermoplastic rubber consisting of styrene/ethylene/butylene/styrene block copolymer | 0.20–0.40 |
| Solvent system based upon 1,1,1-trichloroethane | 50–70 |
| Filler, $SiO_2$ | 1–5 |

Similarly, the formulation for the secondary or top coating may be varied within reasonable limits so as to provide a universally acceptable film over the surfaces to be protected. The ranges may be set forth as follows:

| Component | Weight Percent |
|---|---|
| Solvent system based upon 1,1,1-trichloroethane | 50–80 |
| Filler, $SiO_2$ | 1–10 |
| Thermoplastic resin of styrene/ethylene/butylene block copolymer | 10–20 |
| Hydrocarbon resin tackifier | 4–7 |
| Heat and light stabilizers | .01–2 |

In addition to having highly desirable physical properties, the coating produces a film or layer which has electrical insulating properties as well, and may be utilized, at least in thick film form, for modest or moderate electrical insulation protection. The finished film, particularly in its composite form, resists chipping and cracking, as well as rust and corrosion of the substrate metal. Also, the surface of the coating is sufficiently durable so that it may be readily cleaned with conventional cleaners, and when appropriate, re-coated without requiring removal of the original coating by either scraping, sandblasting, or other removal techniques. Good adhesion of an additional coating of the top coat formulation is obtained over the surface of a washed, previously prepared or old coating of the present invention.

The materials may be provided with pigments and/or dyes so as to provide a surface color which may be desirable in the finished application.

Composite films prepared in accordance with Examples I and II produced the following typical test results:

180° PEEL TEST RESULTS

| Metal | Top Coat | Primer | Peel Force lbs./inch width |
|---|---|---|---|
| Rolled steel | Clear | without | 1.31 |
| Rolled steel | Clear | with | 8.4 |
| Rolled steel | Red | without | 0.83 |
| Rolled steel | Red | with | 8.64 |
| Aluminum | Clear | without | 1.34 |
| Aluminum | Clear | with | 7.68 |
| Aluminum | Red | without | 0.74 |
| Aluminum | Red | with | 9.90 |
| Galvanized steel | Clear | without | 1.40 |
| Galvanized steel | Clear | with | 25.2 |
| Galvanized steel | Red | without | 2.33 |
| Galvanized steel | Red | with | 12.72 |

EXAMPLE III

The coating system of Example I is applied to the cleaned metal surface of the lower side panels on each side of a vehicle to provide a tough-resistant rock-chip panel for trucks and automobiles. After allowing the flexible top coat formulation to dry at room temperature for about 30 minutes, a commercially available acrylic enamel, preferably an acrylic-urethane enamel is applied with appropriate pigments providing the desired color. An example of such a decorative automobile body paint is that particular product sold under the trade designation "Delstar Acrylic Enamel" (Ditzler DXR-80) to which is added one pint of "Delstar Urethane Additive" (DAR) for each gallon of Ditzler DXR-80. These products are commercially available from the Ditzler Automotive Finish Division of Pittsburgh Paint and Glass Industries, Inc. of Pittsburgh, Pa. To achieve a sprayable consistency, the formulation is diluted with 30% by volume of a conventional lacquer thinner.

If a clear acrylic coating is desired, a formulation based upon "Deltron Acrylic Urethane" (DAU-82

Clear) is mixed with an equal amount of "Deltron Acrylic Urethane Catalyst" (DAU-2). These materials are available from the Ditzler Automotive Finish Division of Pittsburgh Paint and Glass Industries, Inc. of Pittsburgh, Pa. The sprayable consistency is achieved by diluting the above mixture with 50% by volume of a conventional lacquer thinner.

The lower side panels on each side of a vehicle are frequently impacted by small rocks and sand picked up by the front wheels and thrown at high velocity at the underside of the vehicle. The use of an impact-resistant treatment for the lower side panels has received the attention of the automobile industry. Panels are covered by various metal sheet constructions, such as chrome-plated steel, and by adhesively attached rubbery films. These are expensive treatments which are difficult to replace when they are damaged. The composite films of the present invention have been found useful in connection with preparing impact-resistant films for the automobile industry to form a composite film of three layers.

EXAMPLE IV

A painted impact absorbing coating for a rock-chip panel is prepared as follows. The coating consists of a primer coating, a conventional top coat as set forth hereinabove, along with one or more finished coats as set forth hereinafter. The metal surface is initially cleaned by conventional treatment such as sandblasting or the like, with this operation being followed by degreasing with a suitable degreaser to provide a clean oil-free surface. The primer coating consists of the following:

A 1:1 mixture of epoxy chromate primer (DP-40) and epoxy primer catalyst (DP-401) available commercially under such trade designations by Ditzler Automotive Finish Division of Pittsburgh Paint and Glass Industries, Inc., of Pittsburgh, Pa. To achieve a sprayable primer formulation, the mixture is diluted with 15% of a suitable solvent such as the polar solvent sold by Shell Chemical under the trade designation "Cyclosol 38 ". The epoxy primer coating is allowed to cure for a period of from 2 to 4 hours. Thereafter, a flexible coating is applied over the epoxy primer coating, with the formulation for the flexible coating being a sprayable coating prepared by diluting four parts of the top coat formulation of Example II with three parts of the solvent mixture comprising a ratio of 50/19/7 of 1,1,1-trichloroethane, VMP Naptha, and methylene chloride.

After allowing the flexible top coat formulation to dry at room temperature for about 30 minutes, a commercially available acrylic enamel may be applied containing appropriate pigments to provide the desired color. Such decorative paint formulations may be selected from those set forth in Example III hereinabove.

For certain spray applications, the top coat formulation of Example I is mixed with the solvent mixture set forth in Example I on a 4:3 ratio in order to obtain a sprayable coating.

I claim:

1. The method of forming a protective film over a metallic surface which comprises:

(a) applying a primer coating to the metal surface from a working solution having the following formulation:

| Component | Weight Percent |
|---|---|
| Thermoplastic resin consisting of methylmethacrylate copolymer, 45% solution in 54/1 ratio of toluene and 2-methoxyethanol | 30.00 |
| Silicon dioxide filler | 2.25 |
| A thermoplastic rubber consisting of styrene/ethylene/butylene/styrene block copolymer | 0.30 |
| 1,1,1-trichloroethane | 67.45 |

and thereafter applying a top coating to the primer, wherein the top coating comprises a working solution having the following formulation:

| Component | Weight Percent |
|---|---|
| A thermoplastic rubber consisting essentially of a styrene/ethylene/butylene/styrene block copolymer | 13.86 |
| Silicon dioxide filler | 1.49 |
| Calcium Carbonate | 3.84 |
| A solvent including a mixture of 50/19/7 of 1,1,1-trichloroethane, VMP Naptha and methylene chloride together with an antioxidant and ultraviolet absorbing components, | 74.69 |

and wherein the composite coatings are permitted to air-dry until the solvent has been substantially removed.

2. The method as defined in claim 1 being particularly characterized in that said working solutions are spray-applied to the surface to be protected.

3. A substrate including a composite having cohesive and adhesive protective films thereon, and wherein the protective films comprise:

| Component | Weight Percent |
|---|---|
| (a) a primer coating having the following formulation: | |
| Thermoplastic resin consisting of methylmethacrylate copolymer | 86.7 |
| Silicon dioxide filler | 11.7 |
| A thermoplastic rubber consisting of styrene/ethylene/butylene/styrene block copolymer | 1.6 |
| (b) a top coating having the following formulation: | |
| A thermoplastic rubber consisting essentially of a styrene/ethylene/butylene/styrene block copolymer | 56.6 |
| Silicon dioxide filler | 6.1 |
| Calcium Carbonate | 15.5 |

and wherein the composite coatings are permitted to air-dry until the solvent has been substantially removed.

4. The coating as set forth in claim 3 wherein an adherent-coherent film having a finely ground pigment contained therein is utilized to form a three-layer film.

5. The method as set forth in claim 1 wherein an outer coating is applied to said top coating in adherent-coherent relationship thereto, and wherein said third coating is an acrylic-urethane decorative coating.

6. The method of forming a protective film over a metallic surface which comprises:

(a) applying a primer coating to the metal surface from a working solution of an epoxy based primer containing a corrosion inhibitor consisting essentially of an inorganic chromate selected from the group consisting of zinc chromate and strontium chromate, and thereafter applying a top coating thereover, wherein the top coating has the following primary components in its formulation:

| Component | Weight Percent |
|---|---|
| A thermoplastic rubber consisting essentially of a styrene/ethylene/butylene/styrene block copolymer | 13.86 |
| Silicon dioxide filler | 1.49 |
| Calcium Carbonate | 3.84 |
| A solvent including a mixture of 50/19/7 of 1,1,1-trichloroethane, VMP Naptha and methylene chloride together with an antioxidant, a tackifier and pigment | 74.69 |

and wherein the composite coatings are permitted to air-dry until the solvent has been substantially removed.

* * * * *

UNITED STATES PATENT AND TRADEMARK OFFICE

CERTIFICATE OF CORRECTION

PATENT NO. : 4,536,454

DATED : August 20, 1985

INVENTOR(S) : Robert J. Haasl

It is certified that error appears in the above-identified patent and that said Letters Patent are hereby corrected as shown below:

Column 8, before Line 54, the following should be inserted:

together with tackifier,
antioxidant and ultraviolet
stabilizer components,

Signed and Sealed this

*Fifteenth* Day of *October 1985*

[SEAL]

*Attest:*

DONALD J. QUIGG

*Attesting Officer*

*Commissioner of Patents and Trademarks—Designate*